United States Patent
Mecklenbraeuker et al.

(10) Patent No.: US 7,136,424 B2
(45) Date of Patent: Nov. 14, 2006

(54) METHOD OR COMMUNICATIONS SYSTEM USING A ROBUST DIVERSITY COMBINATION

(75) Inventors: Christoph Mecklenbraeuker, Vienna (AT); Peter Slanina, Judenau (AT)

(73) Assignee: Siemens Aktiengesellschaft, Munich (DE)

(*) Notice: Subject to any disclaimer, the term of this patent is extended or adjusted under 35 U.S.C. 154(b) by 758 days.

(21) Appl. No.: 10/311,896

(22) PCT Filed: Jun. 29, 2001

(86) PCT No.: PCT/DE01/02434

§ 371 (c)(1),
(2), (4) Date: Dec. 23, 2002

(87) PCT Pub. No.: WO02/01746

PCT Pub. Date: Jan. 3, 2002

(65) Prior Publication Data

US 2004/0088639 A1 May 6, 2004

(30) Foreign Application Priority Data

Jun. 29, 2000 (DE) ................. 100 31 677

(51) Int. Cl.
*H04L 7/02* (2006.01)
(52) U.S. Cl. ..................... 375/267; 375/347
(58) Field of Classification Search ........ 375/147–148, 375/260, 267, 346–349; 455/59, 61, 63.1, 455/65
See application file for complete search history.

(56) References Cited

U.S. PATENT DOCUMENTS

| 5,548,819 | A | * | 8/1996 | Robb ......................... 455/59 |
| 6,192,066 | B1 | * | 2/2001 | Asanuma ................... 375/130 |
| 6,628,738 | B1 | * | 9/2003 | Peeters et al. .............. 375/371 |
| 6,795,422 | B1 | * | 9/2004 | Ohsuge ...................... 370/342 |
| 6,959,033 | B1 | * | 10/2005 | McDonough et al. ....... 375/147 |

FOREIGN PATENT DOCUMENTS

| WO | WO98/53560 | 11/1998 |
| WO | WO 99/26371 | 5/1999 |
| WO | WO99/26371 | 5/1999 |

OTHER PUBLICATIONS

Zhang et al., "A Low-Complexity Antenna Diversity Receiver Suitable for TDMA Handset Implementation", IEEE, 1997, pp. 1753-1757.
Chase, "Code Combining—A Maximum-Likelihood Decoding Approach for Comibining an Arbitary Number of Noisy Packets", IEEE Transactions on Communications, vol. Com-33, No. 5, May 1985, pp. 385-393.

* cited by examiner

*Primary Examiner*—Khanh Tran
(74) *Attorney, Agent, or Firm*—Staas & Halsey LLP

(57) ABSTRACT

A method transmits packet data in a communications system between a transmitter and a receiver. One potential goal is to ensure correct processing of such packet data. To this end, the packet data are repeatedly transmitted by the transmitter and are received by the receiver as data received earlier or data received later. A diversity combination of the data received earlier and the data received later is performed to reconstruct the transmitted data packet.

17 Claims, 2 Drawing Sheets

METHOD OR COMMUNICATIONS SYSTEM USING A ROBUST DIVERSITY COMBINATION

CROSS REFERENCE TO RELATED APPLICATIONS

This application is based on and hereby claims priority to PCT Application No. PCT/DE01/02434 filed on 29 Jun. 2001 and German Application No. 100 31 677.8 filed on 29 Jun. 2000, the contents of which are hereby incorporated by reference.

BACKGROUND OF THE INVENTION

The invention relates to a method for performing a diversity combination in a communications system.

In radio communications systems, messages and information, for example voice, image information or other data, are transmitted using electromagnetic waves between the transmitting and receiving station (base station and subscriber station respectively) via a radio interface. In existing mobile radio communication networks conforming to the GSM standard (GSM: Global System for Mobile Communication), new data services such as a packet data service GPRS (General Packet Radio Service) are also currently being introduced. In addition to the transmission of voice data, third-generation communications systems, e.g. the UMTS (Universal Mobile Telecommunication System) in accordance with the UTRA standard (UTRA: Universal Terrestrial Radio Access), also provide for the transmission of packet data units (PDUs). The packet data units are derived by segmenting and by adding additional control information from large data packets of higher layers or system levels (e.g. Layer 3). In particular, packet data is transmitted asynchronously, or not synchronously, with the result that the transmission durations and/or the transmission paths of individual packet data units transmitted in succession may differ from one other. To identify the packet data units arriving at the receiver, the units are provided with packet data identification information or sequence number. In the systems currently used or proposed, the identification information is transmitted in the header section (header) of the data packet or as transport format combination identifiers (TFCI).

The correct transmission of the identification information is very important here since the data packets are later frequently combined into large blocks, and incorrect identification information would lead to an incorrect combination of individual data packets. In the worst case, such an incorrect combination is not detected until very late, or even not at all, so that a renewed request to transmit the packet data is issued very late, or even incorrect data are further processed. In particular, a non-detected processing of incorrect identification information leads to serious disruption of the traffic at air interfaces between the transmitter and receiver, for the most part with long-lasting consequences.

Since data losses can occur in a multiplicity of situations during the transmission of the packet data units, data protection methods for transmitted data are known. In particular data protection includes encoding methods and repetition methods, e.g. an automatic data repetition method with combinable encoding for forward error correction (FEC) known for short as Hybrid ARQ Type I or II (ARQ: Automatic Repeat Request), which are sketched in FIG. 1. Following a first unsuccessful data transmission of a packet data unit PDU, a renewed transmission is requested (ACK/NACK) by the receiving station MS from the transmitting station BS. While the first transmission can be performed with optional encoding (P1), encoded data P2 are transmitted at least for the repetition. In this case the redundancy can increase from repetition to repetition, with a corresponding increase in the probability that the data packets PDU can be correctly reconstructed at the receiving end.

FIG. 1 shows three ways of obtaining corrected data. The error corrections that are based directly on only the received polynomials P1 and P2 correspond to the ARQ-I method, in which different polynomials P1 and P2 need not necessarily be selected. With the ARQ-I method, the receiver does not need to store the data from earlier transmissions in order to decode the current transmission. The error correction shown in the middle of FIG. 1 combines or chains in accordance with the ARQ-II method the data of the two received polynomials P1 and P2. If the two polynomials P1 and P2 are identical, the encoded data can be combined, which is referred to as diversity combining. If the two polynomials P1 and P2 are different on the other hand, the receiver cannot combine the associated transmissions, but should chain them to form a combined "larger" encoding block, which is subsequently decoded. With diversity combining, in the case of the incorrect reception of a plurality of differently encoded data polynomials, the transmission of the data polynomial Pi that was received with the lowest signal-to-noise ratio is preferably requested again.

In connection with the hybrid ARQ error correction, a diversity combination can be used, e.g. a maximum ratio combining (MRC), if copies of earlier transmitted encoded data of the same polynomial are repeated. With increasing redundancy transmission, that is to say with the increasing number of repeated transmissions with stronger encoding in each case, however, the following errors can occur in the receiving station:

1. If the signaling information is transmitted in-band in the header section of the transmitted data block, that is to say together with the payload data, and is not protected here with an individual checksum (CRC: Cyclic Redundancy Check) to save system capacities and hence costs, then undetected errors can occur when decoding the header section. If the identification information of the data packet or of the header section was corrupted or lost, then the corresponding data block (with diversity combining or chaining) is processed with data from other data packets or data blocks not belonging to it. In particular, this can lead to the destruction of valuable buffered baseband information in the receiving station. In the worst case, such errors can even propagate unnoticed, or only noticed at a late stage.

2. If the receiving station attempts to decode a data block transmitted by an alien transmitting station and received as a result of an overreach, comparable problems may arise.

In general it can be observed that as a rule the above methods offer good results if the noise signals superimposed on a data block can be described as Gaussian distributed noise. In mobile radio communications, however, signaling of alien transmitting stations or data transmitted over other paths can lead to interference that does not correspond to any Gaussian distribution. Such interference cannot be readily handled using methods such as the maximum ratio combination MRC. In particular outliers that are superimposed on the wanted receive signal with high amplitudes also make a negative impact as noise signals. One specific problem of the maximum ratio combination MRC is the necessity of estimating the signal-to-noise ratios from the transmitted data prior to the actual combining. It is no trivial matter to obtain a stable estimate of signal-to-noise ratios when there are outliers present in the transmitted data.

A code combining in which a code rate is adapted to prevailing channel conditions is known from the publication "Cide Combining—A Maximum Likelihood Decoding Approach for Combining an Arbitrary of Noisy Packets", David Chase, IEEE Transactions on Communications, IEEE INC. New York, US, VOL.COM-33, No. 5, May 1985, pages 385–393.

A data transmission in which a data packet with errors is transmitted again is known from WO 99/26371.

SUMMARY OF THE INVENTION

One possible object of the invention is to provide a method for the transmission of packet data units or data packets in a radio communications system, and to provide such a radio communications system which permits a more stable diversity combination.

The application of the robust maximum ratio combination offers both very good performance in the case of Gaussian noise signals and a more stable performance given a variety of, in particular non-Gaussian, noise signals and other error situations.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
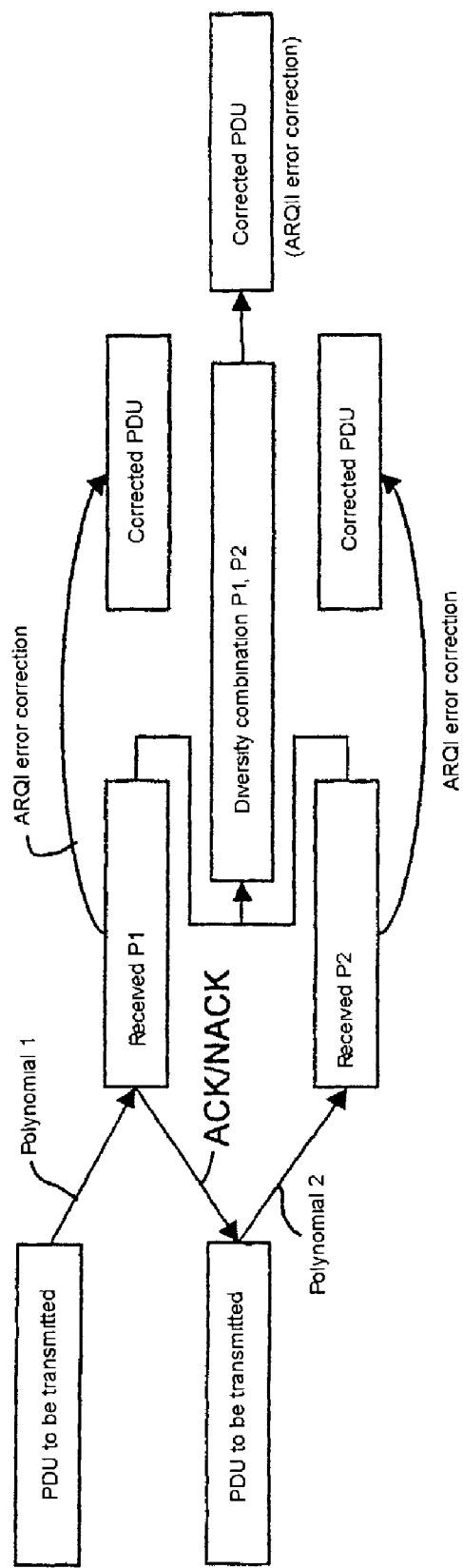
FIG. 1 shows schematic flowcharts for data transmission and data processing with hybrid ARQ methods, and FIG. 2 schematically shows the structure of a known radio communications system by way of example.

Reference will now be made in detail to the preferred embodiments of the present invention, examples of which are illustrated in the accompanying drawings, wherein like reference numerals refer to like elements throughout.

Figure 2:
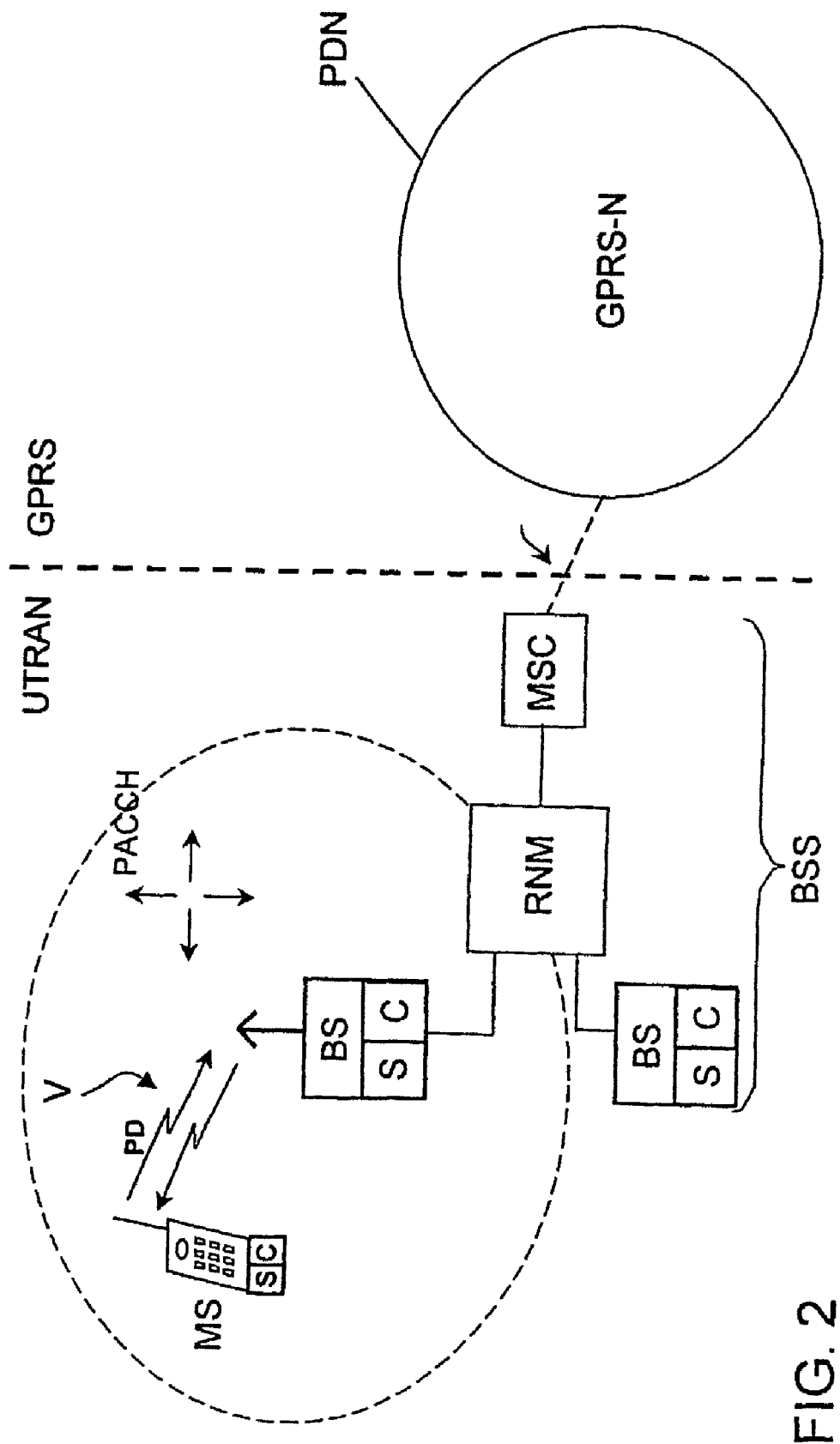

The communications system illustrated in FIG. 2 shows a radio communication network having devices that enable a packet data service GPRS. An example of a stationary or mobile communications terminal is a mobile station MS of a mobile subscriber that is wirelessly connected via an air interface V to devices of a terrestrial UMTS radio network UTRAN (UMTS Terrestrial Radio Access Network), or respectively to its base station system BSS with fixed base stations BS and base station controllers. The connection to a packet-oriented communication network GPRS-N is realized by the UMTS radio network UTRAN via a mobile switching center MSC. The communication network GPRS-N has devices that are known per se for the transmission of packet data PD between the mobile station MS and a packet data network PDN.

The method described below is based on the idea of selecting a robust statistical approach for the received data. A statistical approach is termed robust here if it is insensitive to contaminations of the assumed Gaussian distribution of the interference. That is to say "small changes" in the received data should also cause only "small changes" in the resulting estimates. "Small changes" may be here both "large changes in a small fraction of the data" and "small changes in all data". This proposed approach is intended to combine the advantage of maximum ratio combination (MRC: Maximum Ratio Combining), namely great effectiveness in the non-contaminated case, and the advantages of robust estimations or estimation operators in the contaminated case. For instance, diversity combining with equal level of gain (EGC: Equal Gain Combining) has a more stable behavior in a large class of noise distributions than a maximum ratio combination (MRC), but lower effectiveness in the (non-contaminated) case of Gaussian noise. It also requires no estimation of signal-to-noise ratios from the data.

With the maximum ratio combination MRC, the resulting data z are formed as the sum of the products of the received data x and y with their signal-to-noise ratios SNRx and SNRy respectively:

$$z = SNRx^* x + SNRy^* y.$$

x here denotes the "older" received data from an earlier transmission which the receiver has stored, and y denotes the "more recent" received data of the last transmission received.

During the demodulation of received data, the data (PDU) modulated onto a carrier signal prior to transmission are mapped onto in-phase and quadrature-phase data portions of the complex number level, so that the received data strings x and y which can be further processed as well as the reconstructed data z are complex values.

In the case of Gaussian noise, following the diversity combination the maximum ratio combination MRC produces the maximum signal-to-noise ratio SNRz and the concomitant lowest block error probability. That is to say, the data z combined in this way can be decoded with the maximum probability of success. However, the long error propagation memory of the maximum ratio combination MRC has a negative effect.

When a diversity combination with equal level of gain (EGC) is used, the arithmetic mean of the received data x and y is formed to reconstruct the data z:

$$z = (x+y)/2.$$

In the case of Gaussian noise and different SNRx, SNRy, this produces a lower signal-to-noise ratio SNRz, but is more stable than the maximum ratio combination MRC with respect to fading or fluctuation effects and non-Gaussian noise signals. With respect to the error propagation, however, there is also a long error propagation memory when diversity combining with equal level of gain (EGC) is used.

In a first step, the two methods, maximum ratio combination MRC and estimation operators EGC, are combined into one method in order ultimately to obtain a robust maximum ratio combination. A parameter γ (gamma) is introduced for this purpose, such that the following applies:

$$z = (1-\gamma)x + \gamma y, \text{ where } 0 \leq \gamma \leq 1.$$

The parameter γ may be suitably selected by the receiver here. In the case where y=1/2, the corresponding calculation of the resulting data z leads to the same result as the use of diversity combining with equal level of gain (EGC) known per se, and in the case where γ=SNRy/(SNRx+SNRy) it leads to the same result as the use of the maximum ratio combination (MRC) known per se. Depending on the selection of the factor γ, alternately stability is improved or decreased as against effectiveness, so that the factor γ can also be referred to as stability parameter γ in the text below in order to distinguish it better.

To achieve an optimal result, the calculations are performed a number of times with a different stability parameter $\gamma$ in each case. Given the computing power of even mobile subscriber stations MS today, this does not present any problems. The calculation $$z=(1-\gamma)x+\gamma y$$

is preferably performed here with the following stability parameter values, where $\gamma=0$ corresponds to ignoring the more recent or last received data, $\gamma=1/2$ corresponds to performance of a pure EGC, $\gamma=SNRy/(SNRx+SNRy)$ corresponds to the performance of a pure MRC, and $\gamma=1$ corresponds to ignoring the earlier, i.e. first received data.

The stability parameter $\gamma$ that produced the highest signal-to-noise ratio SNRz, or the successful decoding respectively, is then selected.

To improve the robustness of the method, non-linear cleaning functions $\psi$ are introduced. The functions serve to remove outliers in the data, that is to say in particular individual data values that deviate greatly from the values of the neighboring data or from a mean level, or to limit their influence on the resulting data. Outliers in the data are "pulled in" in the direction of origin by the cleaning function $\psi$. The formula $$z=(1-\gamma)\psi(x/s_x)+\gamma\psi(y/S_y)$$

can be used as an example for calculating the reconstructed data z. Examples of such functions are Huber, Tukey and Hampel functions, that is to say, for example, a function which, when the cleaning function $\psi_H(X)$ is plotted on the ordinate against the value x on the abscissa, proceeds coming from negative abscissa values on the ordinate value −1, then rises from the abscissa value −1 through the common zero point linearly to the value pair 1/1 and proceeds further on the ordinate value 1. In addition, the stability parameter $\gamma$ where $0 \leq \gamma \leq 1$ which is dependent on the data defines the compromise between stability and efficiency. Moreover, robust scaling parameters $s_x$ and $S_y$ can be estimated using standard methods, for example by a method for determining the median of absolute deviation (MAD).

For further enhancement, evaluation factors $\epsilon$ can be introduced in order to rank more recent, new or recently repeated transmitted data y higher than older, buffered data x. In particular, the effect of an error propagation can be countered in this way. For this purpose, the older data y are devalued with the aid of the evaluation factor $\epsilon$ as a small constant $\epsilon$, where in particular $1>>\epsilon>0$, in comparison with the more recent data x, which can be calculated, for example, using the extended formula $$z=(1-\gamma-\epsilon)\psi(x/s_x)+(\gamma+\epsilon)\psi(y/S_y).$$

The method can of course be applied irrespective of the transmission direction, that is to say both when one of the mobile subscriber stations MS is the transmitting station and the base station BS is the receiving station, and vice versa.

The receiving station (MS; BS) is here preferably a receiving device (MS; BS) of a communications system (UMTS, GPRS) for carrying out the method described above. The receiving device (MS; BS) has a storage unit (S) for buffering data packets (PD) received a number of times from the transmitter (BS; MS), and a calculation unit (C) for performing the calculations in accordance with the formulae described above or other formulae having a comparable effect.

Particularly preferred application areas are currently the communications systems having "hybrid" ARQ algorithms with the designations UMTS UTRA in TDD and FDD mode or TD-SCDMA mode for China respectively, Fixed Wireless Access or HIPERLAN/2. The ARQ Type II algorithms increase the redundancy between individual transmissions and used diversity combination. In particular, the method can however also be realized in other communications systems that use a diversity combination for antenna diversity, "soft handover/macro diversity" or the like. The method is not limited here to the described transmission via the air interface V, but in principle can also be applied to other interfaces, for example to line-based interfaces.

The invention has been described in detail with particular reference to preferred embodiments thereof and examples, but it will be understood that variations and modifications can be effected within the spirit and scope of the invention.

The invention claimed is:

1. A method for the transmission of packet data in a communications system between a transmitter and a receiver, comprising:

repeatedly transmitting data packets from the transmitter;

repeatedly receiving data packets at the receiver as data received earlier x and data received later y, and forming reconstructed data packets z at the receiver using a diversity combination technique to combine the data received earlier x and the data received later y, weighting the data received earlier x and the data received later y in the diversity combination technique, in a range between a maximum ratio combination and an equal level of gain diversity combination wherein to reconstruct data packets z, a stability parameter $\gamma$ is used to weight the data received earlier x and the data received later y, in accordance with the following:

$$z=(1-\gamma)x+\gamma y, \text{ where } 0 \leq \gamma \leq 1.$$

2. The method as claimed in claim 1, wherein the stability parameter $\gamma$ depends on a statistical distribution of the data received earlier x and the data received later y.

3. The method as claimed in claim 2, wherein the reconstructed data packets z are estimated a plurality of times with a plurality of respective different stability parameters $\gamma$ in each case.

4. The method as claimed in claim 1, wherein the reconstructed data packets z are estimated a plurality of times with a plurality of respective different stability parameters $\gamma$ in each case.

5. The method as claimed in claim 4, wherein a stability parameter $\gamma$ associated with a maximum signal-to-noise ratio SNRz is selected to form the reconstructed data packets z.

6. The method as claimed in claim 1, wherein the reconstructed data packets z are estimated a plurality of times with a plurality of respective different stability parameters $\gamma$ selected from the group consisting of $\gamma=0$, $\gamma=1/2$, $\gamma=SNRy/(SNRx+SNRy)$ with SNRi being a signal-to-noise ratio of the data received earlier x and the data receiver later y, and $\gamma=1$.

7. The method as claimed in claim 6, wherein the reconstructed data packets are estimated with each of $\gamma=0$, $\gamma=1/2$, $\gamma=SNRy/(SNRx+SNRy)$ with SNRi being a signal-to-noise ratio of the data received earlier x and the data receiver later y, and $\gamma=1$.

8. The method as claimed in claim 7, wherein a stability parameter $\gamma$ associated with a maximum signal-to-noise ratio SNRz is selected to form the reconstructed data packets z.

9. The method as claimed in claim 8, wherein in the diversity combination, robust scale estimation operators $s_x$ and $S_y$ are estimated and used to scale the data received later y.

10. The method as claimed in claim 9, wherein a cleaning operator $\psi$, which is a non-linear function, is used to limit deviating data values when reconstructing the data packets z, in accordance with the following:

$$z=(1-\gamma)\psi(x/s_x)+\gamma\psi(y/S_y).$$

11. The method as claimed in claim 10, wherein an evaluation factor $\epsilon>0$ is used to weight the data received later y greater than the data received earlier x when forming the reconstructed data packets z, in accordance with the following:

$$z=(1-\gamma-\epsilon)\psi(x/s_x)+(\gamma+\epsilon)\psi(y/S_y).$$

12. The method as claimed in claim 6, wherein a stability parameter $\gamma$ associated with a maximum signal-to-noise ratio SNRz is selected to form the reconstructed data packets z.

13. The method as claimed in claim 1, wherein in the diversity combination, robust scale estimation operators $s_x$ and $S_y$ are estimated and used to scale the data received later y.

14. The method as claimed in claim 13, wherein a cleaning operator $\psi$, which is a non-linear function, is used to limit deviating data values when reconstructing the data packets z, in accordance with the following:

$$z=(1-\gamma)\gamma(x/s_x)+\gamma\psi(y/S_y).$$

15. The method as claimed in claim 14, wherein an evaluation factor $\epsilon>0$ is used to weight the data received later y greater than the data received earlier x when forming the reconstructed data packets z, in accordance with the following:

$$z=(1-\gamma-\epsilon)\psi(x/s_x)+(\gamma+\epsilon)\psi(y/S_y).$$

16. A receiving device in a communications system, comprising:
a storage unit to buffer received data packets, each data packet being received a plurality of times from a transmitter; and
a calculation unit to reconstruct the data of the transmitted data packet by combining at least two copies of the data packet using a diversity combination, the copies of the data packet being received at different times, the calculation unit producing reconstructed data z, wherein
in the diversity combination, the calculation unit weights data packets received earlier x and data packets received later y in a range between a maximum ratio combination and an equal level of gain diversity combination, and
to reconstruct data packets z, a stability parameter $\gamma$ is used to weight the data received earlier x and the data received later y, in accordance with the following:

$$z=(1-\gamma)x+\gamma y, \text{ where } 0\leq\gamma\leq1.$$

17. A radio communications system, comprising at least one receiving device, the receiving device comprising: a storage unit to buffer received data packets, each data packet being received a plurality of times from a transmitter; and
a calculation unit to reconstruct the data of the transmitted data packet by combining at least two copies of the data packet using a diversity combination, the copies of the data packet being received at different times, the calculation unit producing reconstructed data z, wherein
in the diversity combination, the calculation unit weights data packets received earlier x and data packets received later y in a range between a maximum ratio combination and an equal level of gain diversity combination, and
to reconstruct data packets z, a stability parameter $\gamma$ is used to weight the data received earlier x and the data received later y, in accordance with the following:

$$z=(1-\gamma)x+\gamma y, \text{ where } 0\leq\gamma\leq1.$$

* * * * *